(12) United States Patent
Sokolan et al.

(10) Patent No.: US 8,612,444 B2
(45) Date of Patent: Dec. 17, 2013

(54) DATA CLASSIFIER

(75) Inventors: Patrick Sokolan, Redmond, WA (US);
Dennis Doherty, Redmond, WA (US);
Claude Duguay, Kenmore, WA (US);
William Radcliffe, Redmond, WA (US);
Virgil Bourassa, Bellevue, WA (US);
John Sheppard, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/557,054

(22) Filed: Jul. 24, 2012

(65) Prior Publication Data
US 2012/0290927 A1 Nov. 15, 2012

Related U.S. Application Data

(62) Division of application No. 12/768,731, filed on Apr. 28, 2010, now Pat. No. 8,255,399.

(51) Int. Cl.
*G06F 7/00* (2006.01)

(52) U.S. Cl.
USPC .......................................... 707/736; 707/802

(58) Field of Classification Search
USPC .......... 707/736, 737, 741, 758, 769, 802, 803, 707/804, 999.003–999.005; 715/255
See application file for complete search history.

(56) References Cited

U.S. PATENT DOCUMENTS

| | | | |
|---|---|---|---|
| 5,950,189 A | 9/1999 | Cohen et al. | |
| 6,839,680 B1* | 1/2005 | Liu et al. | 705/7.33 |
| 7,143,091 B2 | 11/2006 | Charnock et al. | |
| 7,328,204 B2 | 2/2008 | Coady | |
| 7,593,940 B2 | 9/2009 | Gruhl et al. | |
| 7,831,581 B1 | 11/2010 | Emigh et al. | |
| 8,255,399 B2* | 8/2012 | Sokolan et al. | 707/736 |
| 2006/0010368 A1* | 1/2006 | Kashi | 715/512 |
| 2006/0155751 A1 | 7/2006 | Geshwind et al. | |
| 2007/0006129 A1 | 1/2007 | Cieslak et al. | |
| 2007/0271242 A1 | 11/2007 | Lindblad | |
| 2008/0016098 A1 | 1/2008 | Frieden et al. | |
| 2008/0215589 A1 | 9/2008 | Elhaik | |
| 2009/0024609 A1 | 1/2009 | Barker et al. | |

OTHER PUBLICATIONS

Goharian, et al., "Enterprise Text Processing: A Sparse Matrix Approach", Retrieved at << http://ieeexplore.ieee.org/stamp/stamp.jsp?tp=&arnumber=918768 Overview of the Information Retrieval Matrix Approach>>, Proceedings International Conference on Information Technology: Coding and Computing, Apr. 2001, pp. 71-75.
Litwin, et al., "Fast nGramBased String Search Over Data Encoded Using Algebraic Signatures", Retrieved at << http://www.csd.uoc.gr/~hy561/Data/Papers/p207-litwin.pdf >>, Very Large Data Bases, Proceedings of the 33rd international conference on Very large data bases, Sep. 23-27, 2007, pp. 207-218.

* cited by examiner

*Primary Examiner* — Hung T Vy

(57) ABSTRACT

A document classifier may analyze documents for a search engine and tag the documents. A document classifier system may have several different classifiers, each with a separate algorithm for classification. Some of the data classifiers may learn or change the classification over time with a feedback loop. As those classifiers are modified, updated, replaced, or added, the documents that have already been classified by the classifier may be re-examined to update their classification. The document classifier system may maintain a database of documents with a timestamp that the document was classified that may be used to identify those documents whose classifications may be out of date.

20 Claims, 4 Drawing Sheets

DATA CLASSIFIER

BACKGROUND

Search systems are only as useful as the input data. In many search systems, a crawler or other mechanism may gather documents, web pages, or other items and make the items searchable by text. Text-based searches may have many limitations. For example, a document may refer to a "striking tool" but would not be identified for a search for a "hammer".

SUMMARY

A document classifier may analyze documents for a search engine and tag the documents. A document classifier system may have several different classifiers, each with a separate algorithm for classification. Some of the data classifiers may learn or change the classification over time with a feedback loop. As those classifiers are modified, updated, replaced, or added, the documents that have already been classified by the classifier may be re-examined to update their classification. The document classifier system may maintain a database of documents with a timestamp that the document was classified that may be used to identify those documents whose classifications may be out of date.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
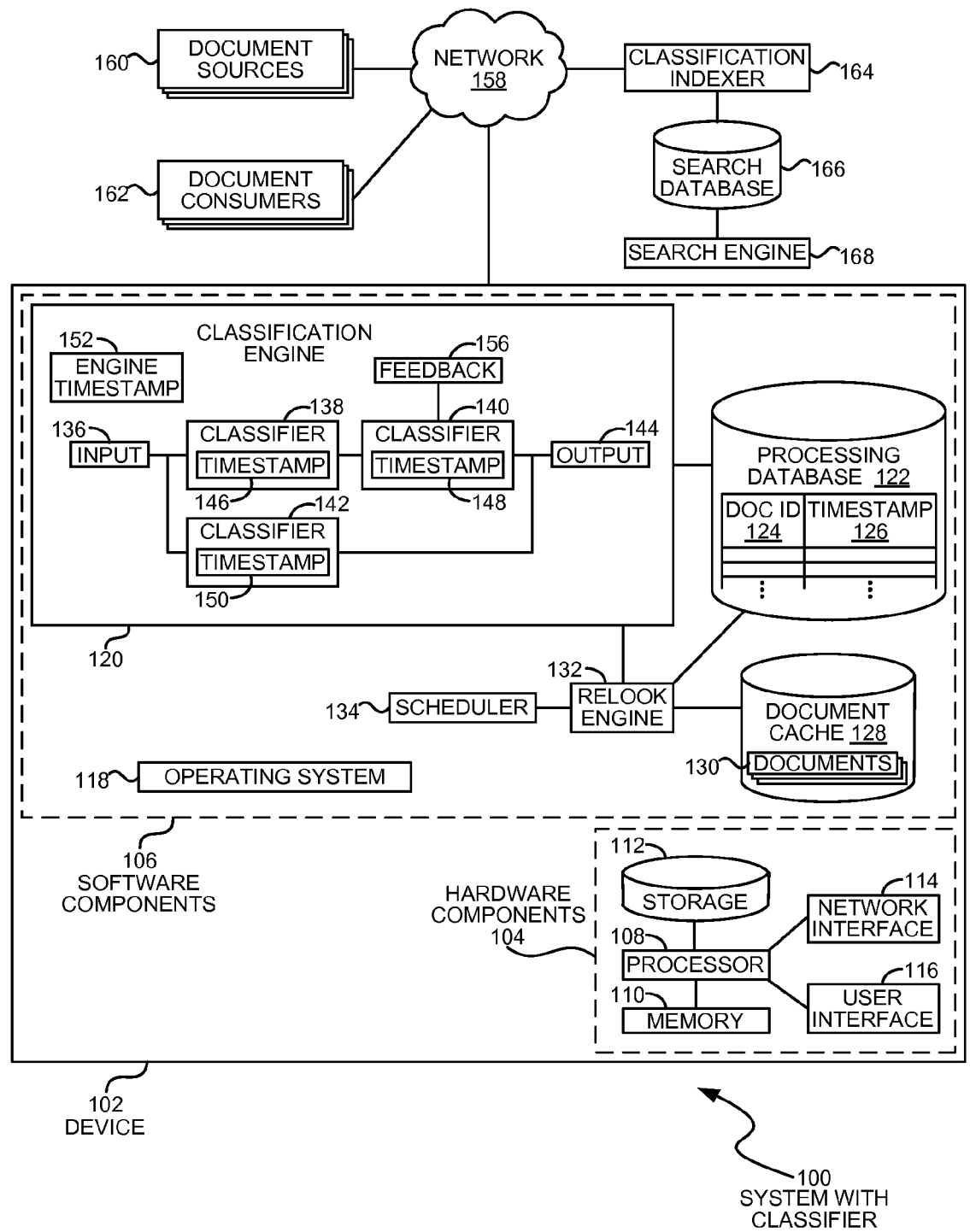
FIG. 1 is a diagram illustration of an embodiment showing a system with a document classifier.

A classification system may analyze documents using one or more classifiers that may evolve or change over time. As the classifiers change, previously analyzed documents may be identified and re-analyzed to update the classifications. A database may be used to store the analyzed documents along with a timestamp for the analysis.

The classifiers may examine data and metadata in a document to tag the document with various tags or identifiers. Those data captured by the tags may be processed by a downstream document consumer.

The classification system may be modular to allow classifiers to be added, removed, or updated within the system. The classifiers may be arranged in a serial fashion, where the output of a first classifier may be used as input to a second classifier. In some cases, two or more classifiers may be independent and may operate in parallel.

Throughout this specification and claims, the term "document" is used to denote the atomic unit that is stored and manipulated by the various systems. The "document" may be a word processing document, spreadsheet document, or other similar file. In some cases, the "document" may be a database record, web page, email message, or any other unit. The "document" may be text based or may include audio, video, or other types of data which may be classified, tagged, searched, or otherwise manipulated.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system for classifying documents. Embodiment 100 is a simplified example of a system that may receive documents from a document source, process the documents to tag content in the documents, and send the documents to a document consumer.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a single device that may process documents from a document source, perform classification on the documents, and transmit the documents to a document consumer. A typical use scenario may be to classify documents that may be indexed and searched in a search system. The classification may result in tags or other metadata that may be indexed and made searchable.

The classification system may have several classifiers that may operate independently to perform specific types of classifications. For example, one classifier may search a document to identify any references to date and time. Another classifier may search a document to identify proper names of people. A third classifier may cross reference the proper names with a database of people, for example. The classification system may be modular in that classifiers may be added, modified, and removed from the system.

When a change may be made to the classification system, the documents may be re-classified using the updated classifiers and a change may be sent to a document consumer to update the classification at the document consumer.

Such a system may enable adaptive classifiers to be used in many applications. An adaptive classifier may adjust settings, parameters, algorithms, or other classification functions based on feedback from a document consumer. As the adaptive classifier "learns" and updates its parameters, those documents classified by an older version of the classifier may be re-classified.

The system may include a database that may include a document identifier and timestamp. When a change is made to the classification engine, the timestamps of the processed documents may be analyzed to identify older documents, then the older documents may be re-classified. Such a process may be known as a relook process.

In many cases, the relook process may be a background process that may operate as a lower priority process than a process that classifies new documents. In other cases, the relook process may be performed at a higher priority than the new document classification.

The device 102 is illustrated as a conventional computing device having hardware components 104 and software components 106. In many embodiments, such an architecture may represent a server computer. In other architectures, the functions of device 102 may be performed by a cluster of server computers, which may be implemented as virtual machines on one or more hardware platforms.

The device 102 may be a server computer, desktop computer, network appliance, game console, or other device. In some cases, the device 102 may be a portable device, such as a laptop computer, netbook computer, personal digital assistant, cellular telephone, or other portable device.

The hardware components 104 may include a processor 108, random access memory 110, and nonvolatile storage 112. The hardware components 104 may also include a network interface 114 and a user interface 116.

The software components 106 may include an operating system 118 on which many applications may execute.

A classification engine 120 may process documents by examining metadata as well as the contents of the document to identify specific content types that may be searchable or otherwise usable by a document consumer. In one mechanism, a classification engine may identify specific content and insert tags that identify the content, so that the content may be better used by a document consumer.

In one use scenario, a classification engine 120 may examine a document to identify people's names within the document. The names may be tagged and used as a search parameter by a search system, which may act as a document consumer. In another use scenario, a similarly tagged document may be received by a collaboration system and linked to the user whose name was tagged.

The classification engine 120 may annotate, tag, or otherwise add information to a document based on the document content. The classification engine 120 may also analyze the content to remove information or redact certain information. In either event, the classification engine 120 may process the document's contents as well as metadata to generate a modified document for a document consumer.

When the classification engine 120 processes a document, the document may be stored in a processing database 122 that may include the document identifier 124 and a timestamp 126. The document identifier 124 and timestamp 126 may be used by a relook engine 132 to identify which documents may be re-classified when a change is made to the classification engine 120.

Some embodiments may include a document cache 128 that may contain stored versions of the documents 130. In some embodiments, the stored documents 130 may be the documents prior to classification, but other embodiments may cache the documents after classification. Some embodiments may store both versions of the documents.

The document cache 128 may be used by the relook engine 132 as a source for the documents for re-classification. When the document cache 128 may not be available or when a document may not be found in the document cache 128, the relook engine 132 may query a document source to obtain another copy of the document for re-classification.

The relook engine 132 may operate using a scheduler 134. The scheduler 134 may start and stop the relook engine 132 based on a time schedule or other conditions. For example, some embodiments may use a scheduler 134 to operate the relook engine 132 during off-peak hours, such as during non-business hours or on weekends. Other embodiments may use a scheduler 134 to launch the relook engine 132 when a certain number or certain percentage of the documents that is out of date, for example.

The classification engine 120 may be a modular system that may include several classifiers. When multiple classifiers are used, the classifiers may be modular and allow classifiers to be added, updated, reconfigured, or removed without affecting other classifiers.

In some embodiments, a classifier may 'learn' or adapt its classification scheme based on feedback from other sources, which may include a document consumer. The adaptive classifiers may adjust the classification settings over time and may result in some documents being processed using older settings than other documents. In such cases, the relook engine 132 may identify and re-classify the older documents.

The classification engine 120 may be arranged with an input 136 or starting point, three classifiers 138, 140, and 142, and an output 144. The classifiers 138 and 140 are illustrated as being in series, such that the output of classifier 138 may be used as input to classifier 140. A series configuration such as classifiers 138 and 140 may be useful when one classifier performs additional operations using the classification of a previous classifier.

An example of a series configuration of classifiers may be in the classification of people's names. A first classifier may examine the contents of a document to identify any proper name for a person. The first classifier may tag the name. A second classifier may examine any tagged names to determine if those names are found in a database, such as a user database. When the tagged names are found in the user database, the second classifier may add a reference to the user database and associate the user with the document. For example, a user's email address or user identification may be added to the document where the user's name appears.

Such classifiers may be examples of two different types of classifiers. The first classifier may examine the text of a document to identify proper names from the context. The first classifier may identify proper names from the capitalization and punctuation, as well as the usage and sentence structure. In some cases, the first classifier may have a dictionary of common names that may be used in association with the context analyzing mechanism.

The second classifier may correlate information derived from the context of a document with a database or other source of information. When a match exists, a relationship between the document and the information source may be added to the document. Such relationships may be used by a document consumer to relate documents together and present other information to a user.

In some cases, two or more classifiers may be configured in parallel. For example, classifier 142 may be configured in parallel with classifiers 138 and 140. A parallel configuration may mean that the parallel classifiers are not dependent on each other and may operate separately and independently. In some embodiments, different processing threads may simultaneously execute classifier 142 along with classifiers 138 and 140, while in other embodiments the classifier 142 may merely be performed separately.

Some embodiments of a classification engine 120 may have decision points that may be evaluated to determine whether or not to process a specific document by a specific classifier. In such embodiments, each document may not be processed by each classifier. For example, a classification engine 120 may perform a metadata analysis to determine that a document has a specific type, such as a spreadsheet type, and may send the document to a classifier capable of analyzing a spreadsheet, and may bypass a classifier that analyzes word processing documents.

The classification engine 120 may have one or more timestamps that may be used by a relook engine 132 to determine which documents may be re-classified when a change is made to the classification engine 120. In some embodiments, each classifier may have separate timestamps, such as classifiers 138, 140, and 142 may have timestamps 146, 148, and 150, respectively, that may indicate when each of the classifiers have been last updated, added, or changed. In some embodiments, a classification engine 120 may have an engine timestamp 152 that may indicate the last change to the classification engine as a whole.

The various timestamps may be used by a relook engine 132 to re-classify documents. In some cases, the relook engine 132 may re-classify documents by processing each document through the entire suite of classifiers. In other cases, a relook engine 132 may re-classify documents by processing documents through a subset of classifiers.

The relook engine 132 may operate on documents that have previously been classified and when at least some of the classification engine 120 has changed. In some embodiments, the relook engine 132 may examine the classifier timestamps to determine which classifiers have been updated and may process the documents through those classifiers. In the case of serial classifiers, the document may be processed through multiple classifiers when one of the classifiers has changed. For example, a change to classifier 138 may prompt a relook engine 132 to re-classify a document through classifiers 138 and 140, even though the classifier 140 has not changed.

In some embodiments, the processing database 122 may include identifiers for each classifier that processed a document. In such embodiments, a relook engine 132 may examine the processing database 122 to identify a subset of classifiers to re-classify a document based on which classifiers were previously used.

Some classifiers, such as classifier 140, may have a feedback mechanism 156 that may refine or change the parameters used for classification. The feedback mechanism 156 may receive input from a document consumer or other source so that the classifier 140 may change or improve its classification algorithm. When a classifier makes such a change, the documents that were previously classified may be re-classified by triggering the relook engine 132.

The classification system may be an integral part in a system that receives documents from document sources 160 over a network 158 and provides annotated or classified documents to various document consumers 162. A document source 160 may be any database, web service, file system, messaging system, or other source that may supply documents for use by another system. A document consumer 162 may be a collaboration system, document management system, or other system that may make use of the documents.

One example of a document consumer may be a search system. A search system may have a classification indexer 164 that may receive documents processed by the classification system and create a search database 166. The classifications, tags, and other information provided by a classification system may be used to create search terms and organize documents for the search database. A search engine 168 may execute against the search database 166. The search database 166 may include references to the original documents so that a search result may point a user to a document stored in one of the document sources 160 for retrieval. In some embodiments, the search engine 168 may return an annotated version of a document as processed by a classification system in response to a search query.

Figure 2:
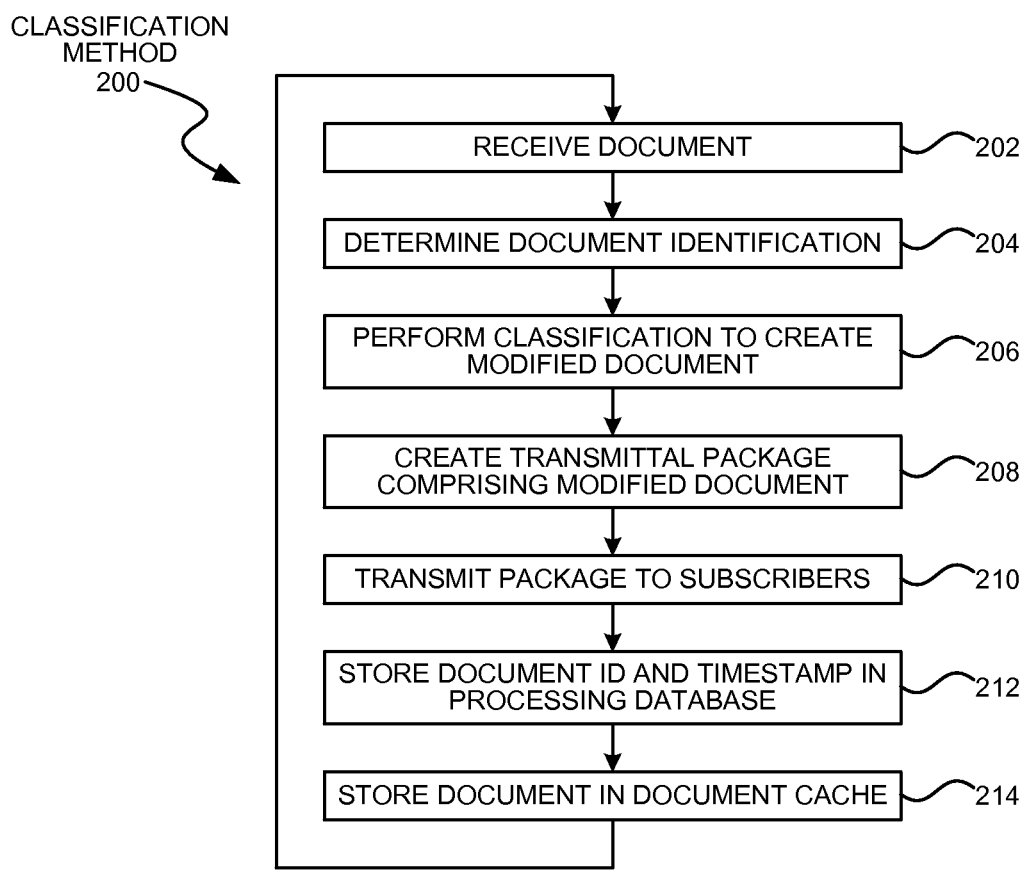
FIG. 2 is a flowchart illustration of an embodiment showing a method for classifying.

FIG. 2 is a flowchart illustration of an embodiment 200 showing a method for performing classification. Embodiment 200 is an example of a method that may be performed by a classification engine, such as classification engine 120 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The classification engine may receive a document in block 202. The document may be received from a document source. In some embodiments, a document source may be on the same hardware platform as the classification engine. In other embodiments, the document source may be available across a network and may reside on another hardware platform.

A document identifier may be determined in block 204. In some embodiments, each document may be received with a pre-defined document identifier. Other embodiments may assign a document identifier in block 204 using an incremental identifier number or some other mechanism. In an embodiment where a document has an associated Universal Resource Identifier (URI), a document identifier may be created by using the URI as a document identifier or by taking a hash of the URI. Example embodiments may perform an MD5 hash on the URI, or may use another hash mechanism that may have no collisions or low collision probabilities.

The classification of the document may be performed in block 206. The classification may include executing one or more classifiers which may use the document as input. The classifiers may be arranged using series relationships, parallel relationships, or other organizations to perform the classification. The result of the classification may be a modified or marked up document.

A transmittal package may be created in block 208 that may include the modified document. The transmittal package may be consumable by a document consumer and may be formatted or arranged such that the document may be received and used. In some embodiments, a classifier may receive documents with many different types, such as an email message and a word processing document, and the classifier system may transform the documents into a single, universal type of transmittal package that may unburden the document consumers from having to handle different file types.

The transmittal package may be sent to the document consumers in block 210. In some embodiments, a publication/subscription mechanism may be used to communicate documents from the classification system to a document consumer. Such a system may enable multiple document consumers to receive transmittal packages from a single classification system. Other embodiments may have a direct connection between a classification system and the document consumer and may not include a publication/subscription mechanism.

The processing database may be updated in block 212 to include the document identifier and a timestamp for the classification. Such information may be used by a relook engine to determine whether or not to re-classify the document.

The document may be stored in a document cache in block 214. Some embodiments may store the modified document in a document cache, while other embodiments may store the original document in a document cache.

Figure 3A:
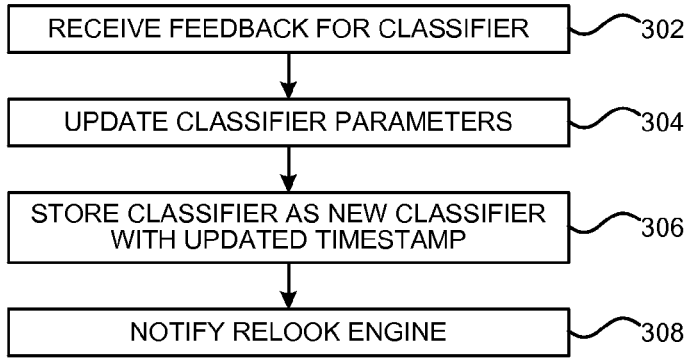
FIG. 3A is a flowchart illustration of an embodiment showing a method for updating a classifier based on feedback.

FIG. 3A is a flowchart illustration of an embodiment 300 showing a method for updating a classifier based on feedback.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Figure 3B:
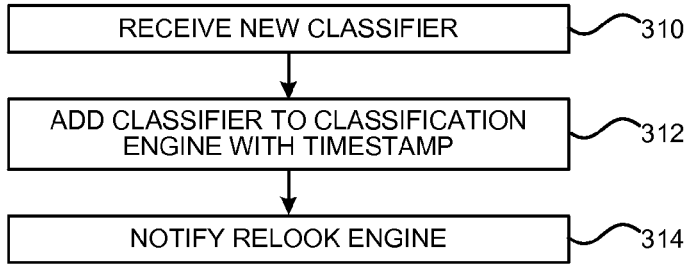
FIG. 3B is a flowchart illustration of an embodiment showing a method for adding a new classifier.
Figure 3C:
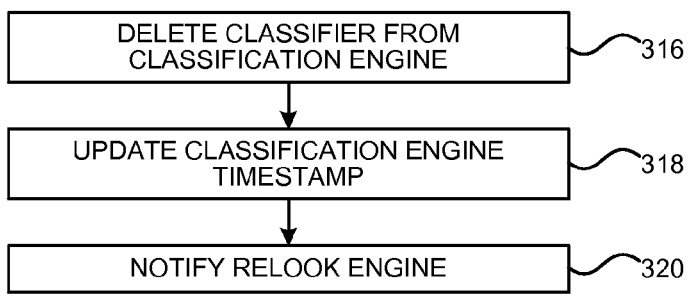
FIG. 3C is a flowchart illustration of an embodiment showing a method for deleting a classifier.

Embodiments 300, 309, and 315 presented in FIGS. 3A, 3B, and 3C, respectively, illustrate several different conditions under which a relook engine may be performed. There may be several different conditions that may trigger a relook process to update the classifications of previously classified documents.

In block 302, a classifier may receive feedback from some source. The source may be a document consumer, outside database, or other source. In some cases, a classifier may receive feedback from a human operator that may change settings for a classification algorithm.

Based on the feedback, the classifier's parameters may be updated in block 304. The classifier may be stored as a new classifier with an updated timestamp in block 306.

Because the classifier has changed by being updated, a relook engine may be notified in block 308.

FIG. 3B is a flowchart illustration of an embodiment 309 showing a method for adding a new classifier.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 310, a new classifier may be received and may be added to a classification engine in block 312. A timestamp for the classifier may also be added in block 312.

Based on the new classifier, a relook engine may be notified in block 314.

FIG. 3C is a flowchart illustration of an embodiment 315 showing a method for deleting a classifier.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A classifier may be deleted from a classification engine in block 316. Based on the deletion in block 316, the classification engine timestamp may be updated in block 318. A relook engine may be notified in block 320.

Figure 4:
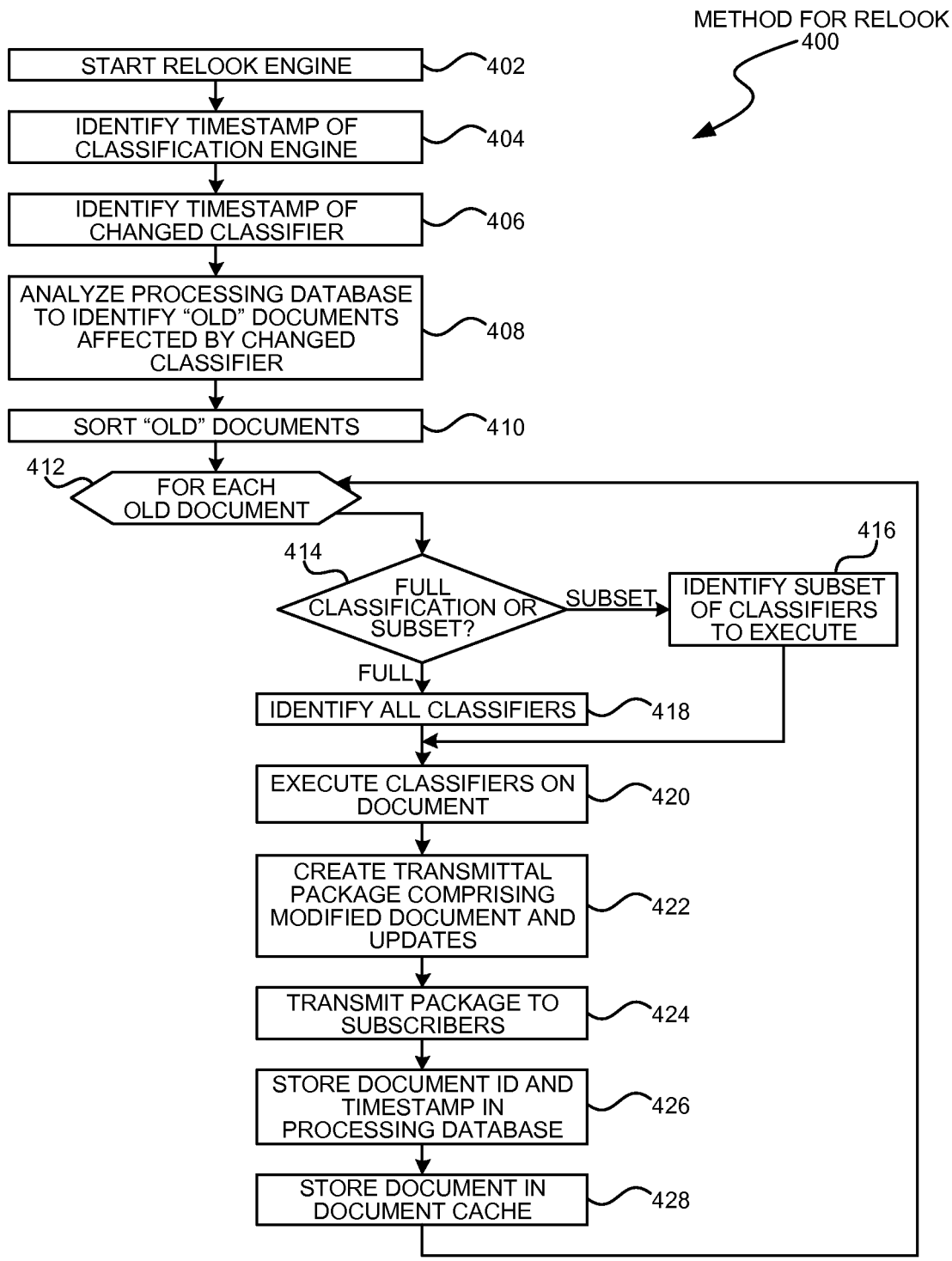
FIG. 4 is a flowchart illustration of an embodiment showing a method for relooking.

FIG. 4 is a flowchart illustration of an embodiment 400 showing a method that may be performed by a relook engine. Embodiment 400 may reflect an example of a method that may be performed by a relook engine, such as the relook engine 132 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is an example of how a relook engine may identify and process documents that may have already been classified. The relook engine may re-classify documents that may be triggered when changes may be made to a classification engine, examples of which are illustrated in embodiments 300, 309, and 315, among others.

In some cases, the relook engine may be scheduled to operate as background processes or during periods where a classification of new documents may have a lower priority, such as during non-business hours. The relook engine may be launched when certain conditions are met, such as when a certain percentage of the documents are out of date, for example.

The relook engine may be started in block 402. A timestamp for the classification engine may be identified in block 404 and a timestamp for any changed classifiers may be identified in block 406.

Using the classifier timestamps, documents may be identified from the processing database, where the documents are older than the classifier timestamps in block 408. In some embodiments, the processing database may contain document identifiers as well as a list of specific classifiers that processed the document. Such embodiments may be used to identify those documents that may be affected by a change in the classification engine and classifiers, as opposed to selecting each of the documents older than the classification engine timestamp.

The old documents may be sorted in block 410. The sorting may arrange the documents so that the older documents may be processed first. In some embodiments, a different sorting algorithm may be used that priorities documents in an order for processing.

Each old document may be processed in block 412. For each document in block 412, a determination may be made in block 414 to perform a full re-classification or merely a partial re-classification. When changes are made to a subset of the classifiers, a partial re-classification may be made in block 414, for example.

If the re-classification will be a partial re-classification in block 414, a subset of the classifiers to execute may be identified. If a full re-classification may be performed in block 414, all of the classifiers may be identified in block 416.

The selected classifiers may be used in block 420 to generate a new classification for the document. In some embodiments, the document may be retrieved from the original document source by using a URI or other identifier. In other embodiments, a document may be retrieved from a document cache.

A transmittal package may be created in block 422 with the modified document and updates to the document. In some embodiments, the transmittal package may have an identifier that indicates the package is for a modification to an existing document as opposed to a new document. Such an identifier may be useful to a document consumer to prioritize handling of the package.

The package may be transmitted in block 424, and the document identifier and timestamp may be updated in the processing database in block 426. The document may be stored in a document cache in block 428.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
    a document receiver that receives documents from a document source;
    a classifier engine that processes said documents to create modified documents, said classifier engine analyzing document contents based on a document classifier to create metadata relating to said document contents;
    a processing database comprising memory that stores a document timestamp for said documents when said documents are processed by said classifier engine; and
    a relook engine that identifies a change to said document classifier, determines a classifier timestamp for said change, re-classifies at least a portion of said documents based on the changed document classifier and identifies said at least a portion of said documents as out of date in need of potential re-classification by comparing said classifier timestamp with said document timestamp.

2. The system of claim 1 further comprising:
    a document cache comprising said modified documents.

3. The system of claim 2, said relook engine that re-classifies said modified documents.

4. The system of claim 1, said classifier engine comprising a plurality of classifiers.

5. The system of claim 4, said change to said classifier engine comprising a change to a first classifier.

6. The system of claim 5, said relook engine that re-classifies by analyzing said portion of said documents by said first classifier.

7. The system of claim 6, said document classifier further comprising a second classifier, said second classifier being connected in series to said first classifier such that output from said first classifier is input to said second classifier;
    said relook engine that re-classifies by analyzing said portion of said documents by said first classifier and said second classifier.

8. The system of claim 6, said classifier engine further comprising a second classifier, said second classifier being operable in parallel to said first classifier such that output from said first classifier is not used as input to said second classifier;
    said relook engine that re-classifies by analyzing said portion of said documents by said first classifier and not said second classifier.

9. The system of claim 1, at least a portion of said classifier engine comprising a feedback loop for adaptive classification.

10. A device comprising:
    memory storing computer executable instructions that, when executed by a processor, provide:
        a relook engine that determines a first classifier has been modified into a second classifier having a classifier timestamp and determines a document that is out of date by comparing the classifier timestamp to a document timestamp; and
        a classifier engine that performs (a) a first analysis of a document with the first classifier, resulting in a first document timestamp of said first analysis and a first modified document having a first classification and (b) a second analysis of the document with the second classifier, resulting in a second document timestamp of said second analysis and a second modified document having a second classification.

11. The device of claim 10, wherein said relook engine retrieves said document that is out of date from a document source.

12. The device of claim 10, wherein said relook engine retrieves said document that is out of date from a cache comprising a cached version of said document.

13. The device of claim 10, wherein said document that is out of date is said first modified document.

14. The device of claim 10, wherein said first classifier is trained using a feedback mechanism to create said second classifier.

15. The device of claim 10, wherein said second classifier comprises said first classifier with an added subset.

16. The device of claim 15, wherein said first classification in said first modified document comprises a tag of a first content item in said document on which the first analysis and second analysis are performed.

17. A system comprising:
a document receiver that receives a first document;
a classification engine that:
   performs a first analysis of said first document with a first classifier that identifies a first content item and tags said first content item with a first tag to create a first modified document comprising said first tag;
   transmits said modified first document to a classification system that classifies said first document using said first tag; and
   stores a document timestamp of said first analysis in a database; and
a relook engine that:
   determines that said first classifier has been modified to a second classifier and determines a classifier timestamp representing when said first classifier has been modified;
   compares said classifier timestamp to said document timestamp to determine that said classifier timestamp is newer than said document timestamp;
   performs a second analysis of said first document with said second classifier that identifies a second content item and tags said second content item with a second tag to create a second modified document comprising said second tag;
   transmits said second modified document to said classification engine; and
   stores a second document timestamp of said second analysis in said database.

18. The system of claim 17, wherein said first classifier has a feedback mechanism and an adaptation mechanism that creates said second classifier.

19. The system of claim 18, wherein said feedback mechanism comprises input from said classification engine.

20. The system of claim 19, wherein said classification engine further comprises a search system.

* * * * *